United States Patent [19]

Estkowski

[11] 4,166,226
[45] Aug. 28, 1979

[54] NO-BACK SYNCHRONOUS MOTOR DRIVE

[75] Inventor: Michael H. Estkowski, St. Joseph, Mich.

[73] Assignee: V-M Corporation, Benton Harbor, Mich.

[21] Appl. No.: 732,504

[22] Filed: Oct. 14, 1976

[51] Int. Cl.² ............................................. H02K 7/10
[52] U.S. Cl. ...................................... 310/41; 192/8 R
[58] Field of Search ................. 310/41, 162, 163, 164, 310/67, 40 MM, 266, 172, 75, 75 C; 192/44, 45, 8 R; 188/82.84

[56] References Cited

U.S. PATENT DOCUMENTS

| 2,865,479 | 12/1958 | Hungerford | 192/45 |
| 2,934,188 | 4/1960 | Bremer | 192/8 R |
| 3,427,485 | 2/1969 | Dotto | 310/41 |
| 3,576,240 | 4/1971 | Nicholson | 192/8 R |
| 3,797,614 | 3/1974 | McCay | 192/8 R |
| 3,975,652 | 8/1976 | Hammond | 310/41 |

FOREIGN PATENT DOCUMENTS

| 2124012 | 11/1972 | Fed. Rep. of Germany | 310/41 |
| 1178641 | 5/1959 | France | 310/41 |

Primary Examiner—R. Skudy
Attorney, Agent, or Firm—Emrich, Root, O'Keeffe & Lee

[57] ABSTRACT

The present invention provides a permanent magnet type of synchronous a.c. motor embodying an improved form of no-back by which the motor upon being energized is caused to start from rest invariably in the predetermined direction of rotation.

Furthermore, the motor is capable of satisfactory operation in a wider range of angular positions of the motor shaft than prior motors, and it is inherently more sensitive to initiate the direction of rotation correctly than devices of the prior art.

6 Claims, 5 Drawing Figures

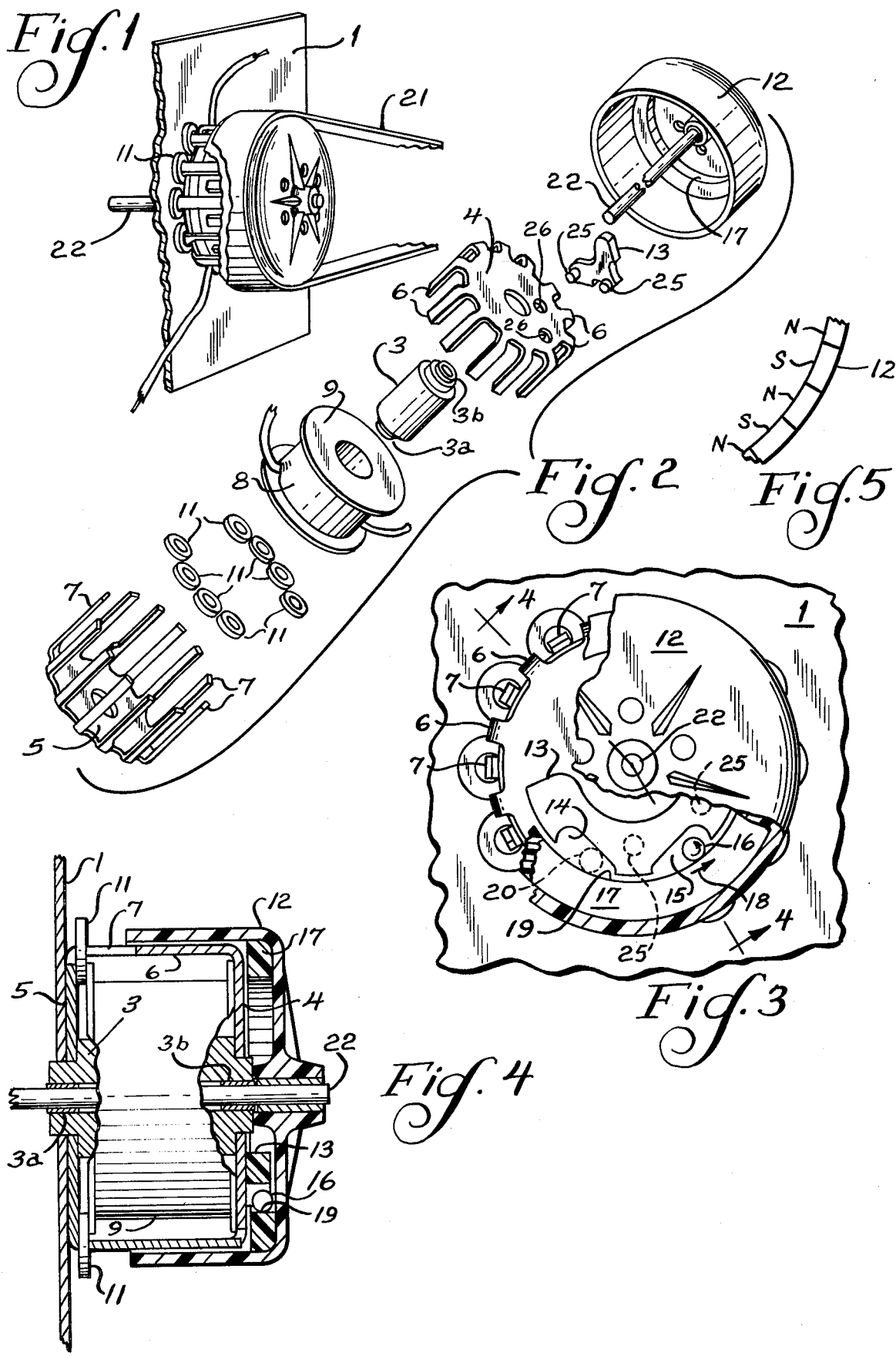

NO-BACK SYNCHRONOUS MOTOR DRIVE

BACKGROUND OF THE INVENTION

A permanent magnet type of synchronous a.c. motor having a stationary winding with a series of pole pieces energized alternately in opposite magnetic directions by alternating current through said winding and having permanent magnetic poles on the rotor, without some provision for insuring the starting up of the motor armature in the right direction, has the inherent disadvantage that upon energization of the winding by alternating current the rotor may start rotating in either a forward direction or a backward direction, unless positive provision is made for preventing starting in the wrong direction, and for starting in the right direction.

PRIOR ART

A prior invention of Robert Hammond, see U.S. Pat. No. 3,975,652, provides an elastic (rubber) clutch ball and metallic clutch surfaces which insure the correct direction of rotation on starting of a synchronous motor utilizing a vertical shaft and employing a permanent magnet rotor rotating in a horizontal plane. But it has an inherent limitation, namely that it requires the motor shaft to be substantially vertical, whereas the self-starting motor of the present invention operates with the shaft horizontal and also it performs satisfactorily in a wide range of non-horizontal positions. It may be employed in positions of the shaft which depart from horizontal as much as 45 degrees. The present motor utilizes the force of gravity to insert (roll) an elastic clutch ball into the bite of the rotor and stator clutch members, which prevents motion of the shaft in the non-desired direction of rotation and causes rebound in the right direction of rotation and continued motion in the right direction.

SUMMARY OF THE INVENTION

The present invention provides a no-back clutch for insuring that a multipolar permanent magnet rotor type of synchronous motor utilizing a horizontal rotor shaft or a shaft inclined at an angle to the horizontal, at least as much as 45 degrees, will start in the predetermined forward direction. That is because any initial movement in the wrong direction is immediately met with a compression and rebound of the elastic ball, which starts the rotor in the right direction. The motor of the present invention may be employed in positions of the shaft which depart from horizontal at least as much as 45 degrees above horizontal or below horizontal. It utilizes the force of gravity to insert the clutch ball into the bite of the rotor and stator clutch members. If the initial alternating current impulse is in the wrong direction for starting rotation in the desired direction, the ball becomes compressed or pinched and upon said impulse of current declining and the succeeding reverse impulse of current arriving the expansion of the ball plus the succeeding impulse in the right direction will push the rotor to start it moving continuously in the right direction of rotation. The expansion of the ball coincides with the beginning of the decline of the wrong direction of magnetic impulse and increase of the forward impulse thereby insuring a positive movement in the right direction. The present arrangement has several advantages not present in the prior art. One advantage is that the motor shaft may be inclined at least 45 degrees up or down and yet function to start off in the correct direction on each start.

An important feature is that the clutch ball is continuously urged toward the clutching position, by gravity and hence the response to any reverse motion of the rotor that is, in the wrong direction, is that such motion will be immediately checked by compression of the ball and reversed by expansion of the clutch ball. This action puts the rotor moving in the right direction at the right time. A major practical advantage is that in accordance with the present invention the no-back clutch will operate with the shaft horizontal or inclined to a substantial degree as much as 45 degrees to the horizontal, without interfering with the operation of the no-back. The operative limit of angularity of the motor shaft is that the angle which will allow the ball to descend into the bite of the clutch jaws in a half cycle of the applied voltage.

An important advantage resides in utilizing the force of gravity in directing and moving the clutch ball into the bite of the jaws of the clutch thus formed. This action is uniform and reliable.

BRIEF DESCRIPTION OF THE DRAWINGS

In the drawings FIG. 1 is a perspective view showing the mounting of the no-back synchronous motor of the present invention on a vertical supporting panel with the shaft in a horizontal position and with the rotor serving as a driving pulley and having a driving belt trained thereover;

FIG. 2 is an exploded view of the components of the motor;

FIG. 3 is an end view taken from the end of the shaft upon which the rotor is fixed, with parts of the rotor broken away to reveal the clutch ball and cage within which the clutch ball has relative motion. The clutch ball shown in full lines is shown in the position assumed when the rotor is moving counterclockwise.

FIG. 4 is a section on two intersecting planes which intersect on a line which is the axis of the rotor shaft and is indicated where the lines 4—4 of FIG. 3 meet; and FIG. 5 is a fragmentary diagram explanatory of the arrangement of poles in the cylindrical rim of the rotor.

DESCRIPTION OF THE PREFERRED EMBODIMENT

The motor of the present invention is shown in FIGS. 1, 3 and 4 with the shaft in horizontal position and arranged for counterclockwise rotation as viewed in FIG. 3. The motor shaft 22 may be inclined as much as 45 degrees above horizontal or below horizontal with proper operation of the no-back clutch which the motor embodies.

The motor of the present invention is shown in FIGS. 1, 3 and 4 as mounted upon a vertical mounting board 1 through the medium of a hub 3a which forms part of the central hollow cylindrical magnetic core 3, upon the opposite ends of which are mounted the stationary field pole plate-members 4 and 5 having integral interdigitated stationary pole pieces 6, 6 and 7, 7. The plates 4 and 5 are attached to the opposite ends of the hollow central paramagnetic core member 3. The hollow core member 3 at its ends provides hubs 3a–3b rigidly supporting the field members 4 and 5 which are assembled in such relation to each other that the pole pieces 6 and 7 are interdigitated and equidistant in spacing angularly and are alternately of the same polarity.

The field winding 8 consists of a single coil wound upon non-magnetic spool 9, said coil functioning when energized to magnetize the parallel pole pieces 7 and 6 into opposite polarities respectively. In the specific motor shown in the present drawings and described in the present description the field members 4 and 5 which have each the same number of parallel field pole pieces, 7 and 6, respectively are assembled in equally spaced interdigitated relation as illustrated in FIG. 3. In this embodiment the pole pieces 6 and 7, are assembled in alternate polarity relation to each other as appears in FIG. 3. The pole pieces 7 are longer than pole pieces 6 in order to accommodate the axial length occupied by the copper damping rings 11 which delay the magnetization of the poles on which they are placed, in a manner well known in the art. The copper damping rings 11 which are strung on the pole pieces 7 of the pole plate 5 (see FIGS. 2 and 4) operate upon magnetization by the winding 9 to delay or choke back in point of time the full magnetization of the pole pieces 7.

The cup shaped rotor 12 contains within it an array of permanent magnet poles of alternate magnetic polarity. The rotor cooperates with the stationary pole pieces 4 and 5, the polarity of which alternates in succession. The cup shaped rotor comprises a body of molded plastic charged with ferric oxide and this material is magnetized to produce a permanent magnetic effect in the adjacent longitudinal areas which then constitute permanently magnetized parallel bars of opposite polarities adjacent to each other center to center by the pitch distance between the field poles 7 and 6 (see FIG. 5).

As indicated in FIGS. 4 and 5 the ferric oxide alternate poles have the same angular center to center spacing as the spacing of the alternate poles 6, 7 on the stationary field plates 4 and 5 when assembled in the manner shown in FIGS. 1 and 4. The central hollow magnetic core 3 has a hub 2 which with anti-friction bearing 3a serves as a bearings for shaft 4 is attached at one end to and mounted upon a vertical frame plate or bracket 1 in the manner shown in FIG. 4. Said frame plate 1 cooperates with the end of hub 2 to hold the field member 5 endwise flat against the stationary supporting frame plate 1. This frame plate 1 may be inclined, left or right, from the vertical position shown in FIG. 4 to as much as 45 degrees without inteference with the operation of the motor.

The ball cage bracket 13 is mounted by rivets 25–25 extending through holes in said bracket 13 and holes 26–26 in the field plate 4 (see FIG. 2). This provides for two ball cages 14 and 15 for selective occupancy by the single elastic clutch ball 16 which is placed optionally in one cage or the other depending upon the desired biasing for controlling the direction of starting and rotation. The cage bracket 13 is permanently attached by rivets 25–25 or otherwise, to the end plate 4 of the field frame. As may be seen from FIGS. 3 and 4 with the rubber clutch ball 16 (as shown in full lines in FIG. 3) located in pocket 15, rotation of the clutch ring 17 in the direction indicated in FIG. 3 by the arrow 18, i.e., movement of said ring 17 in a counterclockwise direction will tend to roll the ball 16 uphill against the force of gravity within the pocket 15 formed in the cage bracket 13. Energization of the winding 9 with alternating current will normally, without the no-back clutch of the pocket 15 and the ball 16, start at random in one direction or the other, that is, either clockwise or counterclockwise indiscriminately depending upon factors which are not under the control of the operator of the motor, whereas it is the desire of the user of the motor to have it start and proceed in one selected direction only, for each closing of the circuit through the motor. That aim of securing unidirectional starting is accomplished in the present construction by assembly of the motor with the ball 16 cooperating with the pocket 15 for one direction of rotation as shown in FIG. 3, or if the opposite direction of rotation is desired the ball is placed in the other pocket 14 during assembly of the motor.

With the ball 16 in pocket 15 assume that the net effect of the initial magnetizing impulse will be to move the rotor in a counterclockwise direction, that is, in the direction of the arrow 18 on FIG. 3. In that event the ring 17 plus gravity will direct and drive the ball into the converging space of pocket 15 causing the ball to clutch the two parts 13 and 17 against movement in the clockwise direction. Obviously, the next impulse of the alternating current will reverse the direction of pressure created by the reverse wave of magnetism to drive the clutch ring 17 in a counterclockwise direction as indicated by the arrow 18 in FIG. 3 since the formation of the pocket is such, as may be seen in FIG. 3, that there can be no pinching of the ball between the bracket 13 and the ring 17 for rotation of ring 17 in the direction of rotation indicated by arrow 18.

Thus, uniformity in the direction of starting from rest is assured in the cooperation of the ball 16 and the inclined pinching surface of the cage 15 and the rotation of the ring 17 inside the rotor. With reference to FIG. 3, the ball may be taken from the pocket 15 in which it is illustrated in full lines in FIG. 3 and placed in the dotted line position 20 of the ball shown in FIG. 3. If the ball is thus transferred to the dotted line position as shown in FIG. 3, the rotation of the rotor will be in a clockwise direction, since it will be clutched automatically against motion in the counterclockwise direction and is free to proceed in the clockwise direction. The ball cage bracket 13 is shaped in general like a letter V and the left hand side is the mirror image of the right hand side, having an open tapered recess on packet 14 which operates for free clockwise rotation of the rotor in the same manner that is herein described for operation of the motor for clockwise rotation. Each direction of rotation is consequential upon the appropriate placement of the ball.

The external surface of the rotor 12 is cylindrical and is free to be employed to drive a flexible belt 21 as illustrated in FIG. 1 for the preferred mode of use of the present motor. Other power take-off means may be employed.

While the illustration of the motor above discussed is shown with the motor shaft 22 horizontal, the shaft 22 may be inclined in either direction, that is angularly either up or down by as much as 45 degrees and the motor will operate as above described.

I claim:

1. In a synchronous a.c. motor having a rotor shaft (22) and being adapted for starting into operation unidirectionally, when the rotor shaft is inclined to the horizontal at an angle of from zero to approximately 45 degrees, said motor having a stationary field frame (3, 4, 5) comprising a tubular field core (3), centrally apertured circular end plates (4 and 5), being attached concentrically to the ends of said core, said end plates having integral interdigitated parallel pole pieces (6, 7), disposed in a cylindrical array concentric with said core, a rotor shaft (22) extending axially through said core (3), and being journaled therein in bearings (3a, 3b), a cup shaped rotor (12) having an end wall and having said rotor shaft (22) affixed coaxially thereto, said rotor (12) containing a circular brake ring (17) mounted on the inside wall of said cup shaped rotor (12) adjacent its closed end, there being a stationary flat arcuate ball cage member (13) mounted flatwise on the outside flat surface of the end wall of the stationary field plate (4) which plate (4) is adjacent the end plate of the rotor (12), and in the same plane as the plane of the brake ring (17), a ball (16) in said ball cage member said ball cage member (13) comprising two of the sides of an adjacent triangular cage member (13) having an open side facing in a radially outward direction, a third side wall for each of said triangular cage members (13) being provided by the adjacent inner periphery of said brake ring (17), said brake ring (17) and the walls of said cage members being disposed in the same plane, motion of the brake ring (17) being checked by the rolling of the ball (16) into engagement with the downwardly sloping diagonal wall of the pocket in which it is confined and with the brake ring (17) upon the initiation of reverse rotational movement of the rotor (12).

2. A no-back permanent magnet type of synchronous motor, constructed to start in a predetermined direction of rotation, comprising a wound stator core (3) of hollow cylindrical form, said motor being capable of operating with its axis disposed at an acute angle to the horizontal of as much as from zero degrees to 45 degrees and having interdigitated external stationary field poles (6, 7), of opposite polarities held in a cylindrical array parallel to the axis of the stator, a cylindrical cup shaped rotor (12) having an inner cylindrical wall coaxial with said cylindrical stator core and loosely embracing said stator poles, a rotor shaft (22) carrying said rotor and extending axially through and having a bearing on said stator, and said shaft (22) being attached to said rotor (12), said rotor having a series of permanent magentic poles of alternate polarity matching the field poles (6, 7) of said stator, an arcuate ball cage member (13) attached to said stator and lying at a level below said shaft and lying within the radial confines of the rotor (12) and in the same plane as the plane of said rotor, an elastic ball in said ball cage member said rotor having a cylindrical clutching surface (19) facing radially inwardly towards the axis of the rotor shaft (22) and lying in the plane of the ball (16) and cage member (13), said clutching surface (19) extending diagonally downwardly to meet a vertical radial line through the axis of the shaft, and having an adjacent upwardly facing concave curved surface (19) substantially concentric with the axis of the motor shaft and extending radially beyond the center of the clutch ball in its radially outermost position for confining the ball in a nonclutching position upon forward motion of the motor armature.

3. The combination of claim 2 with an inclined stationary clutching surface on the inside wall of the plane of the first clutching surface and diverging at an angle to the vertical equal, but opposite to the angle of divergence of the inclined surface of the first cage and terminating in a radial stop to define a second ball cage which is a counterpart of the first ball cage, but constructed for clutching the stator of the rotor for a direction of rotation opposite to that of the permitted rotation of the ball in the first ball cage, and an elastic ball held by gravity in contact with said clutching surface and with said cage when said rotor is moving in the backward direction, whereby the direction of the initial rotation may be reversed following the transfer of the ball from said first named cage to the other cage.

4. The combination of claim 2 wherein the inclined cage surface terminates in a recess for receiving and holding the ball loosely upon forward rotation of the rotor and the cage has a non-clutching recess into which the ball is urged by the forward rotation of the associated rotor.

5. In a synchronous motor having a field structure comprising a central hollow cylindrical core, a first cylindrical array of spaced apart parallel pole pieces, each carried on one end of said core, a second cylindrical array of spaced apart parallel pole pieces carried on the other end of said core and being disposed between the pole pieces of the first array, said field pole pieces of both arrays lying in parallel with each other and being of alternate north and south polarity, a cup shaped rotor having a central axial supporting shaft and a cylindrical rim, and being mounted concentrically on said shaft for rotation radially outside said pole pieces, said rim carrying an array of alternate north and south permanent magnet poles radially outside of said field pole pieces, and said rim being mounted on for rotation by said motor shaft coaxial with said cylindrical array of field pole pieces, said shaft carrying a concentric brake ring having an interior cylindrical braking survace, a clutch ball, a stationary ball cage member comprising a stationary inclined clutch surface extending diagonally from a point lying at a radius less than the radial distance of the clutch surface from the axis of the rotor shaft by an amount greater than the diameter of said clutch ball whereby on motion of the ball in backwards circumferential direction relation to said stationary braking surface of the rotor will be stopped, but on a forward circumferential direction of motion of the rotor, the ball will be moved and aided by its own resilieht expansion in a direction to free the rotor.

6. In a synchronous motor having a permanent magnet rotor, the combination of a field structure comprising a circular coil, a hollow magnetic core in said coil, a pair of magnetic field plates mounted parallel to each other on the ends of said core, each plate carrying a cylindrical array of interdigitated pole pieces, said pole pieces being alternately of the same polarity, means for stationarily mounting said field structure with the axis thereof not substantially more than 45 degrees to horizontal, a ball cage member comprising a cage plate mounted on an end plate of said magnetic core, said cage plate having a convex arcuate periphery which has two triangular ball pockets of graduated radial depth, whereby each provides a ball cage of substantially concentric peripheral outline at each side of its lower end and having an arcuate wedge shaped recess in its inner edge, said motor further comprising a cooperating cup shaped rotor member having a central supporting shaft concentric with said field structure and having a ring of permanent magnet poles surrounding said pole pieces of said stator, said rotor member comprising a series of permanent magnet poles carried by said cup shaped rotor and being of alternate polarity and concentric with the shaft, and a clutch ring adjacent one end of the rotor concentric with said shaft, a mounting plate attached to one end of said core for supporting said motor in a position in which the core lies at an angle of between 45 degrees above and 45 degrees below horizontal, a flat ball cage member having a pair of triangular ball pocket recesses of generally arcuate outline attached flatwise to the end plate which is embraced by the rotor cup and a soft rubber ball enclosed within said cage and tending to gravitate into the narrow part of the cage and the adjacent clutch ring to connect the cage and the clutch ring for unidirectional drive of the rotor in the direction determined by the pocket in which the clutch ball is located.

* * * * *